United States Patent
Johnson et al.

(10) Patent No.: US 10,649,275 B1
(45) Date of Patent: May 12, 2020

(54) BACKLIGHT AND DISPLAY FOR STRAY LIGHT CONTROL

(71) Applicant: Rockwell Collins, Inc., Cedar Rapids, IA (US)

(72) Inventors: Rick J. Johnson, Shellsburg, IA (US); Albert N. Stuppi, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/015,277

(22) Filed: Jun. 22, 2018

(51) Int. Cl.
*G02F 1/1335* (2006.01)
*G02F 1/13357* (2006.01)

(52) U.S. Cl.
CPC .. *G02F 1/133606* (2013.01); *G02F 1/133603* (2013.01); *G02F 2001/133607* (2013.01); *G02F 2001/133626* (2013.01)

(58) Field of Classification Search
None
See application file for complete search history.

(56) References Cited

U.S. PATENT DOCUMENTS

| 2006/0139953 A1* | 6/2006 | Chou | G02B 3/0056 362/613 |
| 2012/0038751 A1* | 2/2012 | Yuan | H04N 5/23232 348/51 |
| 2016/0103364 A1* | 4/2016 | Nam | G02F 1/133603 349/69 |

* cited by examiner

*Primary Examiner* — Phu Vu
(74) *Attorney, Agent, or Firm* — Donna Suchy

(57) ABSTRACT

A display is described. The display includes an array of light sources, collimating optics, a diffuser, a liquid crystal layer and a controller. The array of light sources includes a first group of light sources and a second group of light sources. The collimating optics are arranged to receive and collimate light from the first group of light sources, but not the second group of light sources. The diffuser is arranged to receive and diffuse the collimated light, directed normal to the diffuser, from the collimating optics and light from the second group of light sources. The liquid crystal layer is arranged to receive light from the diffuser and to display an image. The controller is configured to control the array of light sources such that at least some of the light sources emit light.

20 Claims, 7 Drawing Sheets

BACKLIGHT AND DISPLAY FOR STRAY LIGHT CONTROL

The inventive concepts disclosed herein generally relate to the field of displays with backlights.

BACKGROUND

Aircraft typically have displays to be seen by the aircraft pilot and other passengers of the aircraft. A pilot may be limited in moving their head within a headbox, and thus views the display within a certain angular range (viewing envelope). Thus the pilot may view the display only within a viewing angular range.

Stray light from displays can cause distracting reflections from windscreens, such as cockpit canopies. The stray light may be particularly problematic in night operations of the aircraft. On the other hand, stray light is typically not a problem during daytime viewing, and thus controlling stray light during daytime may not be needed or desired

SUMMARY

In one aspect, embodiments of the inventive concepts disclosed herein are directed to a display. The display includes an array of light sources, collimating optics, a diffuser, a liquid crystal layer and a controller. The array of light sources includes a first group of light sources and a second group of light sources. The collimating optics are arranged to receive and collimate light from the first group of light sources, but not the second group of light sources. The diffuser is arranged to receive and diffuse the collimated light, directed normal to the diffuser, from the collimating optics and light from the second group of light sources. The liquid crystal layer is arranged to receive light from the diffuser and to display an image. The controller is configured to control the array of light sources such that at least some of the light sources emit light.

In a further aspect, embodiments of the inventive concepts disclosed herein are directed to a display. The displays includes an array of light sources, refracting optics, a Fresnel lens, a liquid crystal layer, and a diffuser. The refracting optics are arranged to receive and diverge light from the light sources. The Fresnel lens is arranged to receive the diverged light from the refracting optics and to converge the diverged light to provide converged light within a predetermined size at a focal plane. The liquid crystal layer is arranged such that the converged light from the Fresnel lens passes through the liquid crystal layer. The diffuser is arranged between the Fresnel lens and the liquid crystal layer such that the converged light from the Fresnel lens passes through and is diffused by the diffuser.

In a further aspect, embodiments of the inventive concepts disclosed herein are directed to a method of operating a display. Light from an array of light sources is collimated. The collimated light is diffused. The diffused light is directed to a liquid crystal layer to display an image. The array of light sources is controlled such that only some of the light sources emit light.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding a display with two groups of light sources, a first group where the light is collimated and directed normal to a diffuser, and a second group where the light is not collimated but directed to the diffuser, provide for an increased flexibility in controlling the direction and viewing angular range of the light emitted from the display, while at the same time reducing stray light. The light from the display may be controlled by controlling whether light is emitted from the light sources of the groups.

In the case that the diffuser is low scattering, and provides some directionality of the light impinging on the diffuser, the light may be controlled to reduce light outside the viewing angular range of the display relative to a user, such as an aircraft pilot. Stray light reflections may be reduced. The display brightness for a given power applied to the display may be reduced. Thus, power savings is achieved as well as increased display brightness. Further, the display light may be maintained within the viewing angular range, while reducing light outside the viewing angular range.

Moreover, according to embodiments of the inventive concepts disclosed herein regarding an array of light sources, corresponding lens array, and Fresnel lens, light from the display may be converged within a predetermined size to stay within a headbox. This allows for a more tailored headbox. The placement of the Fresnel lens allows for control of light near a liquid crystal layer and does not impact the uniform illumination of the liquid crystal layer. The inclusion of the Fresnel lens provides design flexibility.

The term collimated light herein includes substantially collimated light, which need not be perfectly collimated. Further, the term collimated optics and collimated lens includes any optical element arranged to reduce the divergence of light from the source.

Figure 1:
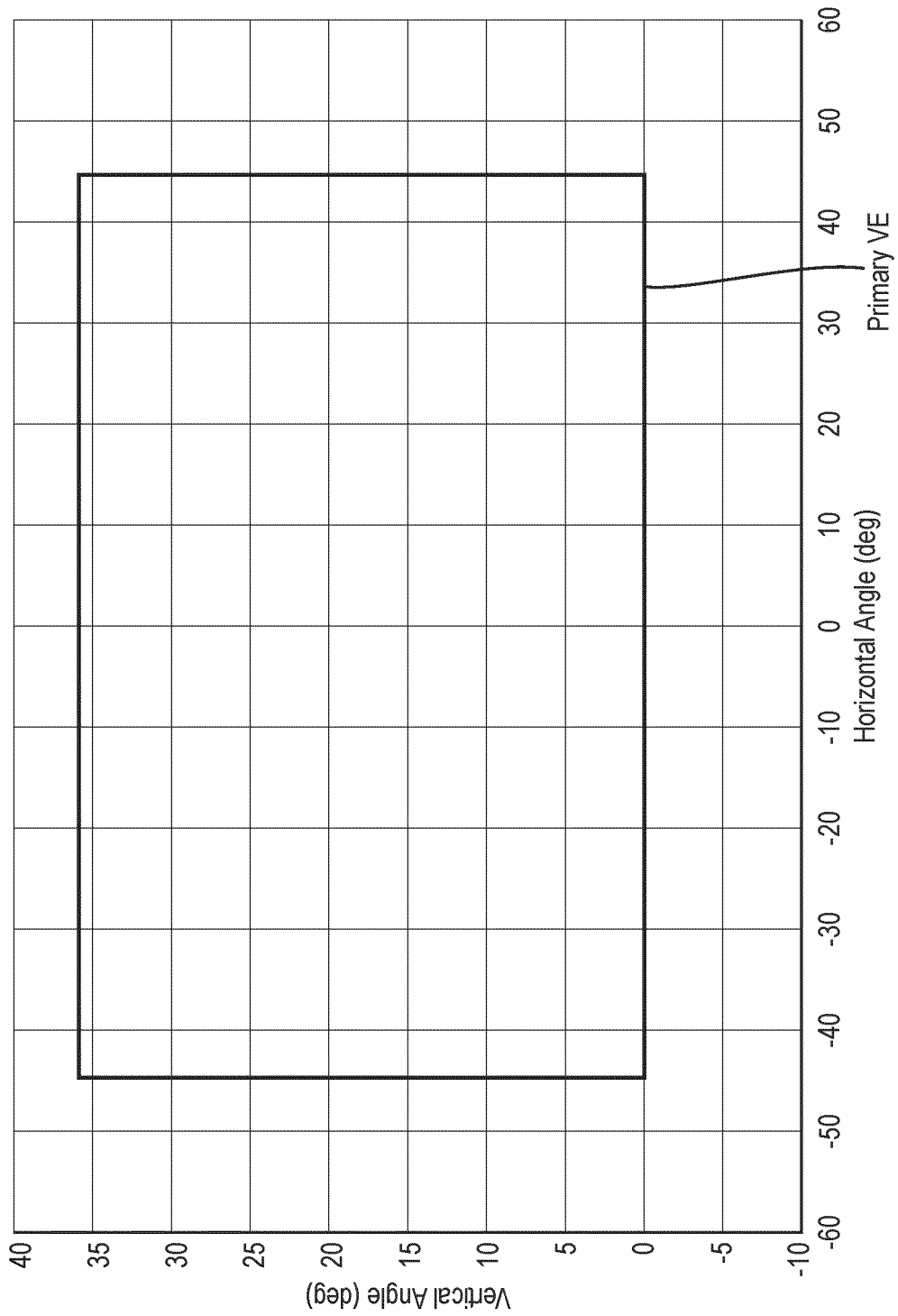
FIG. 1 illustrating a viewing angular range for a viewing arrangement.

FIG. 1 illustrates a viewing angular range for a primary viewing angular range (Primary viewing envelope (VE)). The primary viewing angular range is shown bounded by a solid line. As can be seen, the viewing angular range is expressed in terms of a horizontal viewing angle range and a vertical viewing angle range.

In general, the viewing angular range will depend on the relative position of the viewer and the display. In an environment where the viewer is a pilot of an aircraft, the viewing angular range may depend on the particular aircraft.

Figure 2A:
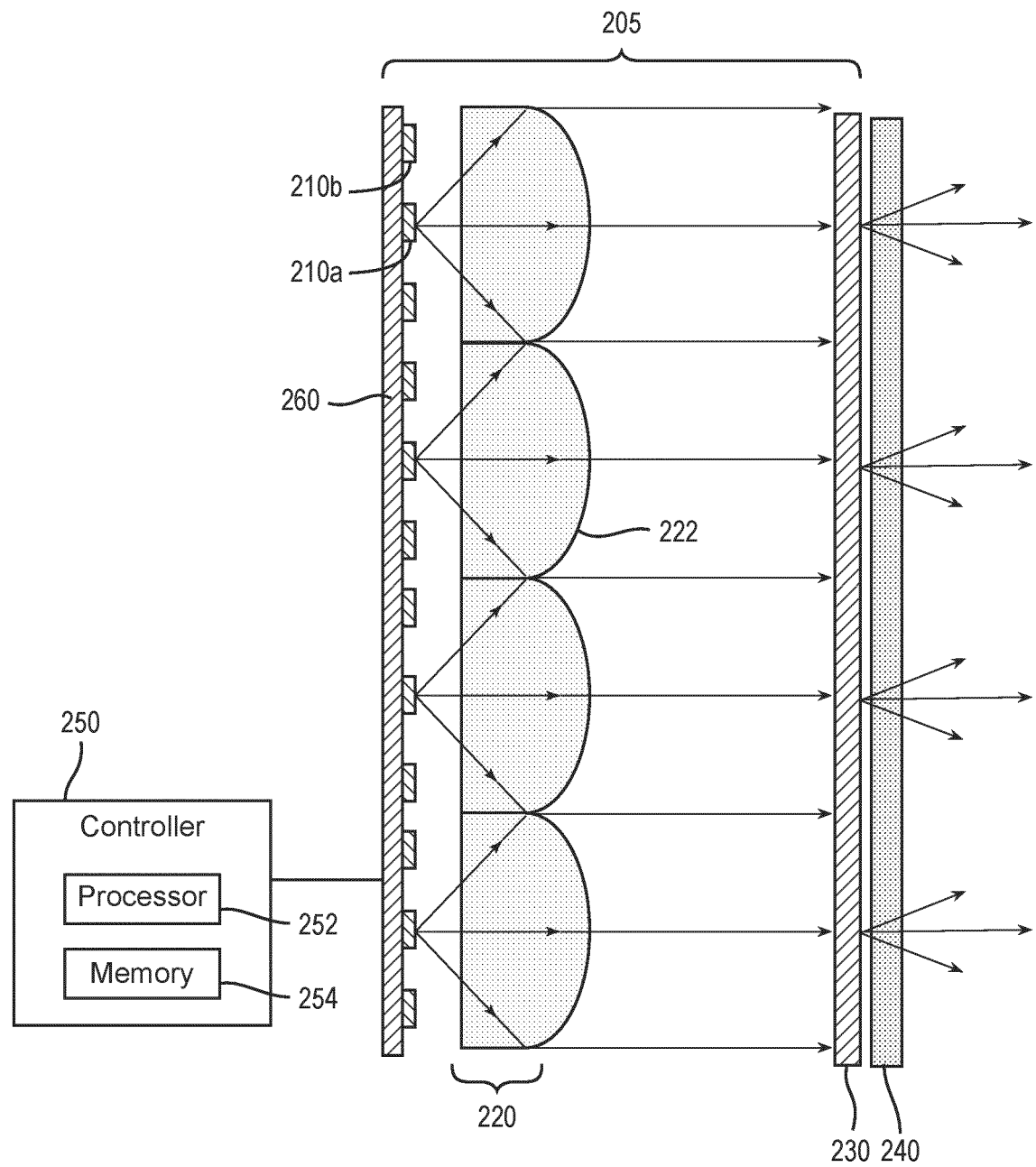
FIG. 2A is a schematic of a display according to inventive concepts disclosed herein.

FIG. 2A is a schematic of a display 200 according to inventive concepts disclosed herein. The display 200 includes an array of light sources 210 (light sources 210a and 210b), collimating optics 220, a diffuser 230 and a liquid crystal layer 240 and a controller 250. The substrate 260, light sources 210, collimating optics 220, and diffuser 230 together make up a backlight 205.

The light sources 210 may be arranged on the substrate 260 to support the light sources 210. The substrate 260 may be, for example, a printed wiring board (PWB).

The light sources 210 may be, for example, sources of white light. For example, the light sources 210 may be light emitting diodes (LEDs), or may be other types of white light sources.

The light sources 210 include two groups of light sources. A first group of light sources 210a and a second group of light sources 210b. The first group of light sources 210a are arranged relative to the collimating optics 220 such that light from the light sources 210a are collimated and directed normal to the diffuser 230. The second group of light sources 210b are arranged such the collimating optics 220 do not collimate the second group of light sources 210b, and the light from the second group of light sources 210b impinging on the diffuser 230 is not collimated.

Figure 2B:
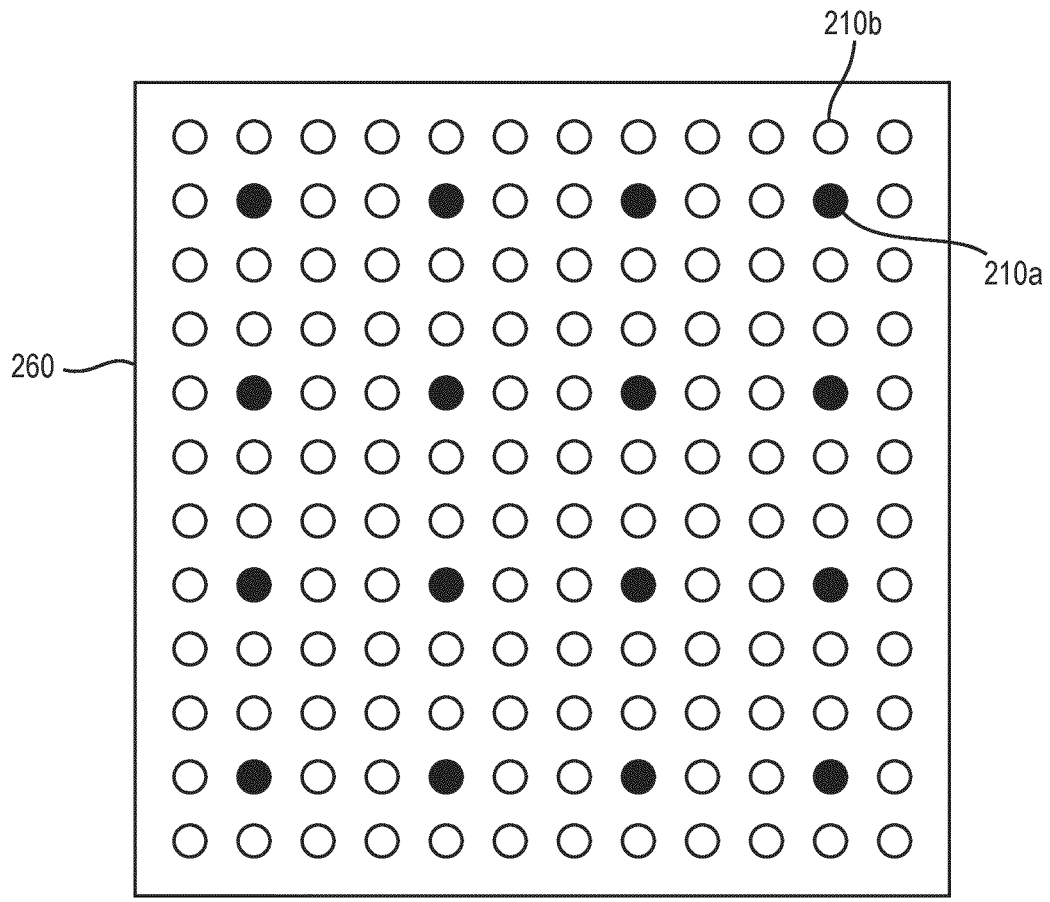
FIG. 2B is a top view of the arrangement of light source of the display of FIG. 2A according to inventive concepts disclosed herein.

FIG. 2B is a top view showing the arrangement of the first group of light sources 210a and the second group of light sources 210b. The light sources 210a are shown by dark circles, while the light sources 210b are shown by open circles.

The collimating optics 220 may include an array of lenses 222. The lenses 222 may be spherical or cylindrical lenses, for example. The lenses 222 may be other than spherical or cylindrical, and may have a surface defined by a function, such as a polynomial, for example. The array of lens 222 may be made of plastic, or other appropriate materials. The lenses 222 may have a variety of cross-section shapes, such as square or rectangular, for example. The collimating optics 220 may be other than an array of lens, and may include refractive and/or reflective elements. The lenses 222 may be arranged relative to the first group of light sources 210a such that each of the light sources 210a is arranged at a focal point of a respective of the lenses 222. Further, the lenses 222 may be arranged relative to the second group of light sources 210b such that no light sources 210b are arranged at any focal point of a lens 222 of the array of lenses 222.

The diffuser 230 is arranged to receive and diffuse the collimated light, directed normal to the diffuser 230, from the collimating optics 220. Thus the diffuser 230 receives collimated light originating from the first group of light source 210a which is collimated by the collimating optics 220 and directed to the diffuser 230. The diffuser 230 further receives light from the second group of light sources which is not collimated and diffuses that light. The diffuser 230 may provide sufficient diffusion such that the collimating optics 220 and the light sources 210 are not visible when viewing the display 200.

The diffuser 230 may be a low diffusion diffuser such that light is not significantly scattered beyond what is needed to mask the collimating optics 220 and the light sources 210. A low diffusion diffuser may be, for example, a holographic diffuser. The low diffusion reduces the amount of light from the first group of light sources 210a which is scattered, and thus reduces the amount of stray light due to light scattering.

The low diffusion diffuser provides for a narrower light distribution for collimated light impinging normal to the diffuser 230, as compared to uncollimated light impinging on the diffuser. In particular, the low diffusion diffuser is such that the collimated light directed normal to the diffuser 230 and originating from the first group of light sources 210a, which collimated light is not scattered, provides a light distribution pattern which is relatively narrow in angular range. On the other hand, the light originating from the second group of light sources 210b which is not scattered provides a light distribution pattern which is relatively larger in angular range because the light from second group is not collimated by the collimating optics 220. Thus, the low diffusion diffuser reduces the amount of light which is directed out of the viewing angular range at least for collimated light impinging normal to the low diffusion diffuser. Thus, controlling the light sources 210 such that the first group of light sources 210a emit light, but the second group of light sources 210b does not emit light provides for a light distribution pattern that is relatively narrow in angular range.

The liquid crystal layer 240 receives light from the diffuser 230 and provides an image. The liquid crystal layer 240 may include liquid crystal material, regions of which may be transparent or opaque based on an appropriate voltage being applied to the regions of the liquid crystal material. The liquid crystal layer 240 may further include color filters (not shown) if the display is a color display.

The controller 250 may include a processor 252 and a memory 254, for example. The processor 252 performs certain functions, for example based on software in the memory 254. The controller 250 is configured to control the array of light sources 210 such that at least some of the light sources emit light. For example, as shown in FIG. 2A, only the first group of light sources 210a may be controlled to emit light, while the second groups of light sources 210b are controlled such that they do not emit light.

FIG. 2A illustrates an arrangement where the controller 250 controls the array of light sources 210 such that only the first group of light sources 210a emit light. As mentioned above, controlling the light sources 210 such that the first group of light sources 210a emit light, but the second group of light sources 210b do not emit light provides for a light distribution pattern that is relatively narrow in angular range. At the same time the diffuser 230 provides diffused light sufficient to provide a uniform light background that masks the light sources 210 and the collimating optics 220. This arrangement is appropriate for night time operation where stray light outside the viewing angular range may be an issue.

Figure 3:
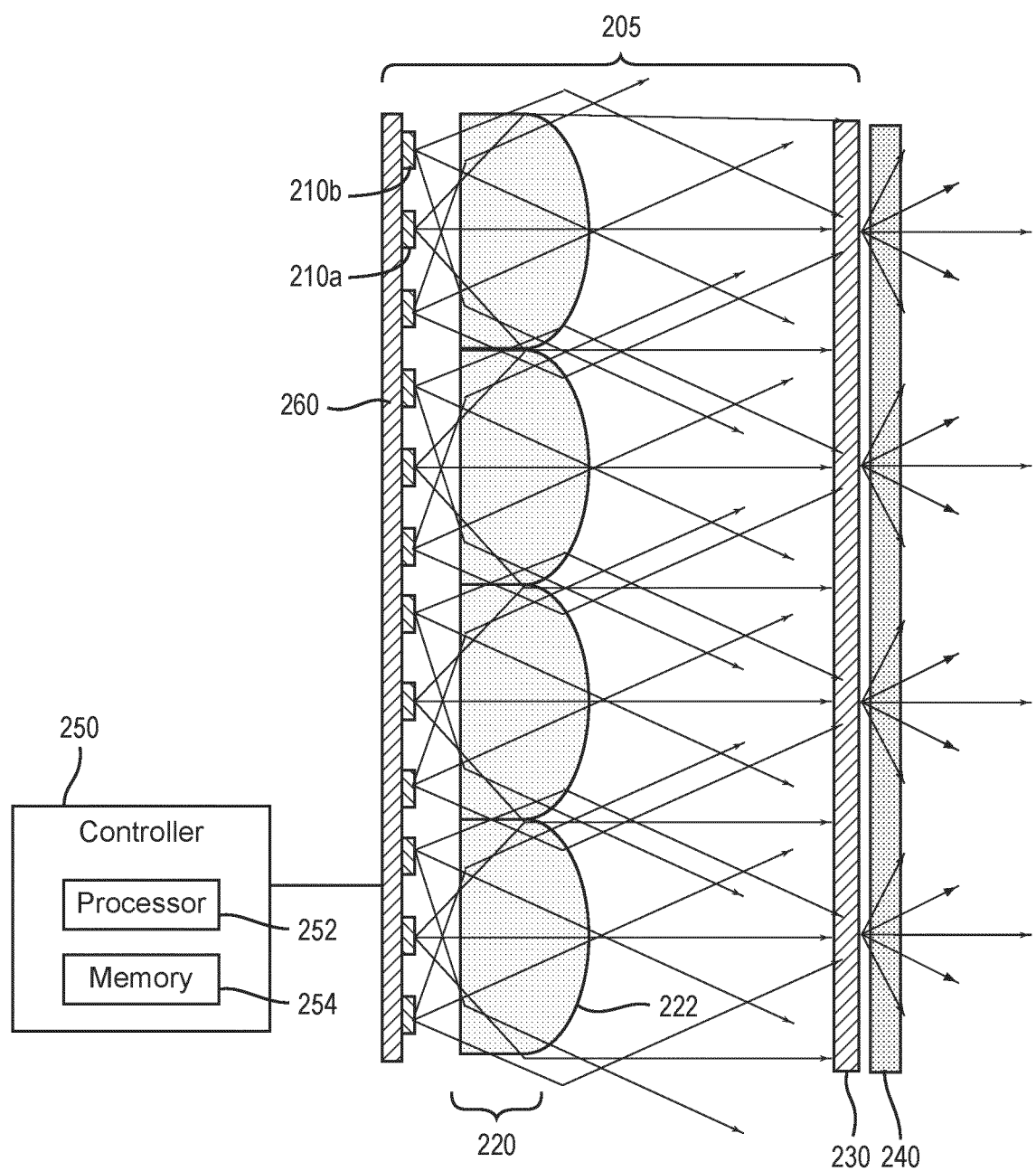
FIG. 3 illustrates a display with an arrangement of the light sources where all of the light sources are controlled to emit light according to inventive concepts disclosed herein.

FIG. 3 illustrates an arrangement where all of the light sources 210a and 210b are controlled to emit light. FIG. 3 is similar to FIG. 2A, except that in FIG. 3 all of the light sources 210a and 210b are controlled by the controller 250 to emit light. As discussed above, the second group of light sources 210b provide a relatively wider light distribution. Thus the arrangement of FIG. 3 may be appropriate for environments where a wider light distribution outside of the diffuser 230 is acceptable, such as when light outside the viewing angular range is acceptable, for example in daytime operations. Further, the control of the light sources 210a and 210b according to claim 3 provides for a display 200 with increased brightness because all of the light sources 210a and 210b are controlled by the controller 250 to emit light. Such increased display brightness is appropriate for daytime operations.

Figure 4A:
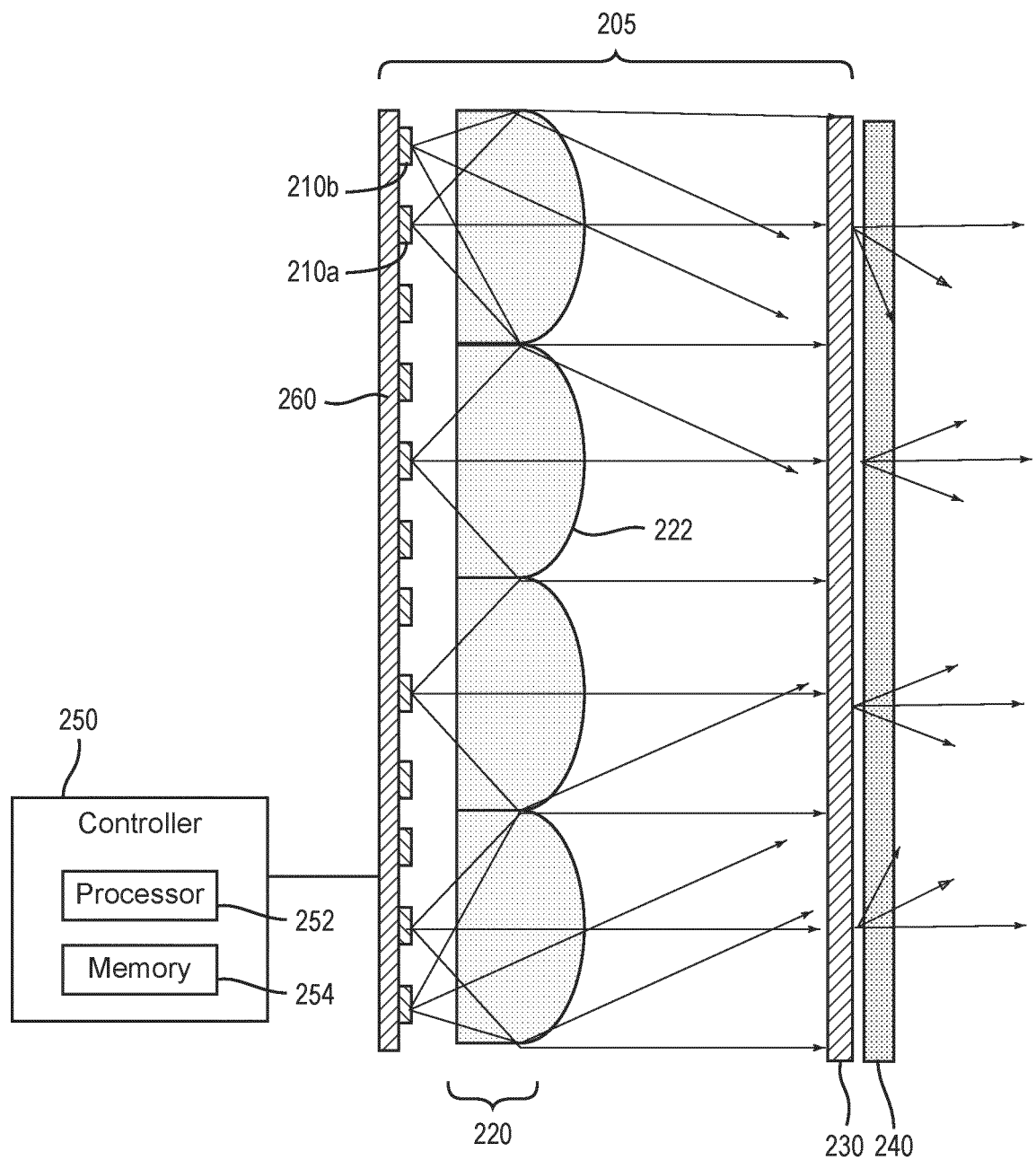
FIG. 4A illustrates a display with an arrangement of the light sources where light sources in the periphery of the display are controlled to emit light according to inventive concepts disclosed herein.
Figure 4B:
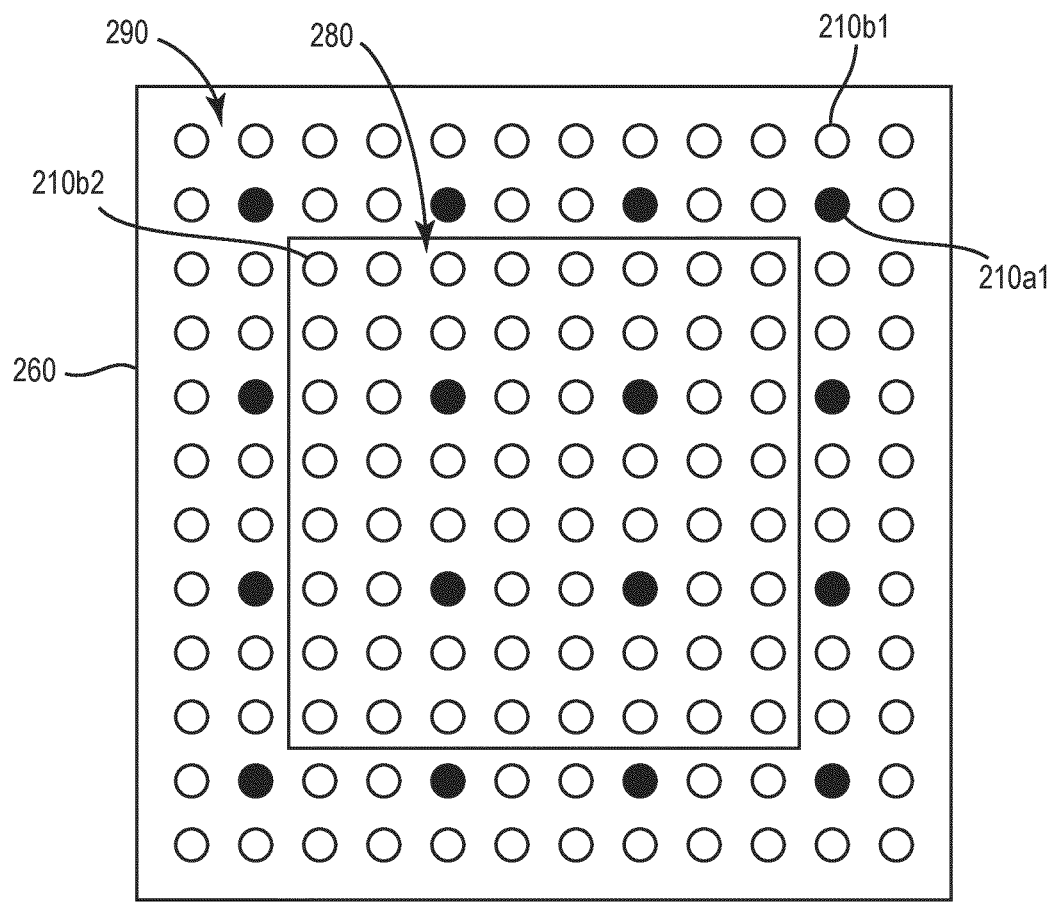
FIG. 4B is a top view of the arrangement of light source of the display of FIG. 4A according to inventive concepts disclosed herein.

FIGS. 4A and 4B illustrate an arrangement where the second group of light sources 210b includes a third group of light sources 210b1 and a fourth group of light sources 210b2. FIG. 4A is similar to FIG. 3, except for the particular light sources 210 that are controlled by the controller 250 to emit light. The third group of light sources 210b1 are arranged in a peripheral region 290 of the array of light sources, while the fourth group of light sources 210b2 are arranged in an inner region 280 of the array within the peripheral region 290.

FIG. 4B is a top view showing the arrangement of the first group of light sources 210a and the second group of light sources 210b for control as provided in FIG. 4A The light sources 210a are shown by dark circles, while the light sources 210b are shown by open circles.

In the arrangement of FIGS. 4A and 4B, the controller 250 is configured to control the array of light sources 210 so that the first group of light source 210a emit light. Further the controller is configured to control the array of light sources 210 so that the third group of light source 210b1 in the peripheral region 290 emit light, and to control the fourth group of light sources 210b2 arranged in the inner region 280 so that they do not emit light.

Controlling the third group of light source 210b1 in the peripheral region 290 to emit light allows for light from the third group of light source 210b1 to be directed back to a viewer of the display, and more light may be directed to the viewer. This can be beneficial, for example, in night operations (as well as in daytime operations) using a wide display where the edges of the display would have increased light illumination due to light from the peripheral region 290. Typically for a larger display, a viewer views the edges of the display at a significantly different angle than the center, where the edge of the display would ordinarily have a reduced brightness. The increased light from the peripheral region compensates for the ordinarily reduced brightness of the edge of the display.

Figure 5:
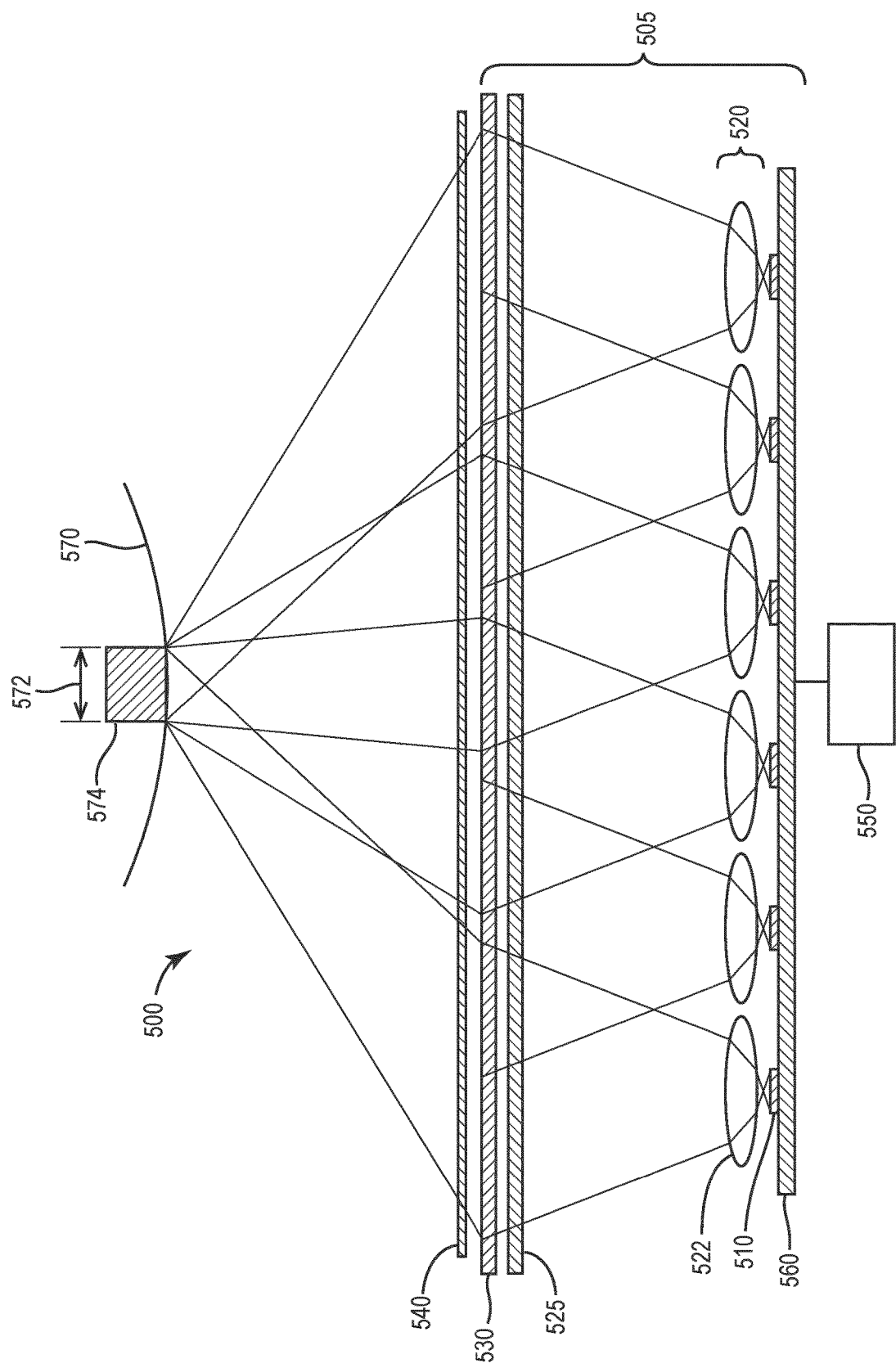
FIG. 5 is a schematic of a display with a Fresnel lens according to inventive concepts disclosed herein.

FIG. 5 is a schematic of a display 500 according to the inventive concepts disclosed herein. The display 500 includes an array of light sources 510, refracting optics 520, a Fresnel lens 525, a diffuser 530, a liquid crystal layer 540 and a controller 550. The substrate 560, light sources 510, refracting optics 520, Fresnel lens 525, and diffuser 530 together make up a backlight 505.

The light sources 510 may be arranged on the substrate 560 to support the light sources 510. The substrate 560 may be, for example, a printed wiring board (PWB). The light sources 510 may be, for example, sources of white light. For example, the light sources 510 may be light emitting diodes (LEDs), or may be other types of white light sources.

The refracting optics 520 may be arranged to receive light from the light sources 510, and to diverge the light received from the light sources 510. The refracting optics 520 may be arranged at a distance from light sources 510 such that the refracting optics 520 partially collimates light from the light sources 510, but the light has some divergence. The refracting optics 520 may include an array of lenses 522. The lenses 522 may be spherical or cylindrical lenses, for example. The lenses 522 may be other than spherical or cylindrical, and may have a surface defined by a function, such as a polynomial, for example. The array of lenses 522 may be made of plastic, or other appropriate materials. The lenses 522 may have a variety of cross-section shapes, such as square or rectangular, for example. The refracting optics 520 may be made of other than an array of lenses and may include refractive or reflective optics.

The Fresnel lens 525 may be arranged to receive the diverged light from the refracting optics 520, and to converge the diverged light to provide converged light with a predetermined size 572 at a focal plane 570 of the display 500. The Fresnel lens 525 may be circularly symmetric about its optical axis, or other than circularly symmetric. For example, the Fresnel lens 525 may be more elliptical with the focal length at the top and bottom being shorter that the left and right focal lengths.

The predetermined size 572 may correspond, for example, to a size of a headbox 574 of a pilot of an aircraft. Thus, the optics of the display 500, including the refracting optic 520 relative to the light sources, and the Fresnel lens 525 direct light toward a predetermined size at the focal plane 570. This arrangement provides viewing privacy for the viewer who has a head positioned within the head box 574.

The liquid crystal layer 540 is arranged such that the converged light from the Fresnel lens 525 passes through the liquid crystal layer 540. The liquid crystal layer 540 may include liquid crystal material, regions of which may be transparent or opaque based on an appropriate voltage being applied to the regions of the liquid crystal material. The liquid crystal layer 540 may further include color filters (not shown) if the display is a color display.

The diffuser 530 may be arranged between the Fresnel lens 525 and the liquid crystal layer 540 such that the converged light from the Fresnel lens 525 passes through and is diffused by the diffuser 530. The diffuser 530 may be a low diffusion diffuser such that light is not significantly scattered beyond what is needed to mask the refracting optics 520 and the light sources 510. A low diffusion diffuser may be, for example, a holographic diffuser. The low diffusion reduces the amount of light from the light sources 510 which is scattered, and thus reduces the amount of stray light due to light scattering.

Embodiments of the inventive concepts disclosed herein regarding a display with two groups of light sources, a first group where the light is collimated and directed normal to a diffuser, and a second group where the light is not collimated but directed to the diffuser, provide for an increased flexibility in controlling the direction and viewing angular range of the light emitted from the display, while at the same time reducing stray light. The light from the display may be controlled by controlling whether light is emitted from the light sources of the groups.

In the case that the diffuser is low scattering, and provides some directionality of the light impinging on the diffuser, the light may be controlled to reduce light outside the viewing angular range of the display relative to a user, such as an aircraft pilot. The display brightness for a given power applied to the display may be reduced. Thus, power savings is achieved as well as increased display brightness. Further, the display light may be maintained within the viewing angular range, while reducing light outside the viewing angular range.

Moreover, according to embodiments of the inventive concepts disclosed herein regarding an array of light sources, corresponding lens array, and Fresnel lens, light from the display may be converged within a predetermined size to stay within a headbox. This allows for a more tailored headbox. The placement of the Fresnel lens allows for control of light near a liquid crystal layer and does not impact the uniform illumination of the liquid crystal layer. The inclusion of the Fresnel lens provides design flexibility.

The embodiments of the inventive concepts disclosed herein have been described in detail with particular reference to preferred embodiments thereof, but it will be under-

What is claimed is:

1. A display comprising:
an array of light sources including a first group of light sources and a second group of light sources;
collimating optics arranged to receive and collimate light from the first group of light sources, but not light from the second group of light sources;
a diffuser arranged to receive and diffuse collimated light, directed normal to the diffuser, from the collimating optics and the light from the second group of light sources;
a liquid crystal layer arranged to receive light from the diffuser and to display an image; and
a controller configured to control the array of light sources such that at least some of the light sources emit light;
wherein the collimating optics are positioned between the light sources and the diffuser, and the diffuser is positioned between the collimating optics and the liquid crystal layer; and
wherein the light emitted by the first group and second group of light sources travels along a path out of the first or second group of light sources, through the collimating optics, through the diffuser, and to the liquid crystal layer.

2. The display of claim 1, wherein the collimating optics includes an array of lenses arranged to collimate the light from the first group of light sources,
wherein each light source of the first group is arranged at a respective focal point of a corresponding lens of the array of lenses, and no light sources of the second group is arranged at any focal point of a lens of the array of lenses.

3. The display of claim 1, wherein the array of light sources includes an array of light emitting diodes.

4. The display of claim 1, wherein the diffuser includes a holographic diffuser.

5. The display of claim 1, wherein the collimating optics includes at least one of spherical lenses or cylindrical lenses.

6. The display of claim 1, further comprising a substrate supporting the array of light sources.

7. The display of claim 6, wherein the substrate includes a printed wiring board.

8. The display of claim 1,
wherein the controller is configured to control the array of light sources such that only the first group of the light sources emit light.

9. The display of claim 2, wherein the controller is configured to control the array of light sources such that the first group of the light sources emit light.

10. The display of claim 1,
wherein the second group of light sources includes a third group of light sources in a peripheral region of the array of the light sources and a fourth group of light sources in an inner region of the array of the light sources within the peripheral region
wherein the controller is configured to control the array of light sources such that a first and third group of light sources emits light, but not the fourth group of light sources.

11. A display comprising:
an array of light sources;
refracting optics arranged to receive and diverge light from the light sources, wherein the refracting optics are positioned a distance away from the array of light sources so that the light emitted by the array of light sources and received by the refracting optics is at least partially collimated;
a Fresnel lens arranged to receive diverged light from the refracting optics and to converge the diverged light to provide converged light within a predetermined size at a focal plane;
a liquid crystal layer arranged such that the converged light from the Fresnel lens passes through the liquid crystal layer; and
a diffuser arranged between the Fresnel lens and the liquid crystal layer such that the converged light from the Fresnel lens passes through and is diffused by the diffuser;
wherein the Fresnel lens and the refracting optics cooperatively direct the light emitted by the light sources within the predetermined size at the focal plane.

12. The display of claim 11, wherein the refracting optics includes an array of lenses corresponding to the array of light sources.

13. The display of claim 11, wherein the array of light sources includes an array of light emitting diodes.

14. The display of claim 11, wherein the diffuser includes a holographic diffuser.

15. The display of claim 11, further comprising a substrate supporting the array of light sources.

16. The display of claim 11, wherein the substrate includes a printed wiring board.

17. A method of operating a display comprising:
collimating light emitted by an array of light sources with collimating optics;
diffusing collimated light from the collimating optics with a diffuser;
directing diffused light from the diffuser to a liquid crystal layer to display an image; and
controlling the array of light sources such that only some of the light sources emit light;
wherein the collimating optics are positioned between the array of light sources and the diffuser, and the diffuser is positioned between the liquid crystal layer and the collimating optics.

18. The method of claim 17, wherein the array of light sources includes a first group of light sources in a peripheral region of the array, and a second group of light source in an inner region of the array within the peripheral region;
wherein the array of light sources are controlled such that a higher density of the first group of light sources emits light than a density of the second group of light sources which emits light.

19. The method of claim 17, wherein the array of light sources includes an array of light emitting diodes.

20. The method of claim 17, wherein the diffusing the collimated light is performed by a holographic diffuser.

* * * * *